United States Patent
Wang et al.

(10) Patent No.: US 7,839,016 B2
(45) Date of Patent: Nov. 23, 2010

(54) MAINTAINING OUTPUT I/O SIGNALS WITHIN AN INTEGRATED CIRCUIT WITH MULTIPLE POWER DOMAINS

(75) Inventors: Bingda Brandon Wang, Milpitas, CA (US); George Shing, Fremont, CA (US); Puneet Sawhney, San Jose, CA (US)

(73) Assignee: ARM Limited, Cambridge (GB)

( * ) Notice: Subject to any disclaimer, the term of this patent is extended or adjusted under 35 U.S.C. 154(b) by 342 days.

(21) Appl. No.: 12/000,573

(22) Filed: Dec. 13, 2007

(65) Prior Publication Data

US 2009/0153210 A1    Jun. 18, 2009

(51) Int. Cl.
    *H02J 3/12* (2006.01)
(52) U.S. Cl. .......................... 307/31; 323/234
(58) Field of Classification Search ............... 307/31; 327/565; 323/234; 326/41
    See application file for complete search history.

(56) References Cited

U.S. PATENT DOCUMENTS

| | | | |
|---|---|---|---|
| 5,721,933 A * | 2/1998 | Walsh et al. ................. | 713/300 |
| 5,739,701 A | 4/1998 | Oshima | |
| 6,590,444 B2 * | 7/2003 | Ikehashi et al. ............. | 327/541 |
| 6,753,698 B2 | 6/2004 | Carpenter et al. | |
| 6,950,951 B2 | 9/2005 | Flynn | |
| 7,046,063 B2 | 5/2006 | Kuang et al. | |
| 7,279,927 B2 * | 10/2007 | Falkowski et al. ........... | 326/33 |
| 7,312,635 B2 | 12/2007 | Tanaka et al. | |
| 7,369,815 B2 | 5/2008 | Kang et al. | |
| 7,593,202 B2 * | 9/2009 | Khazhinsky et al. ......... | 361/56 |

FOREIGN PATENT DOCUMENTS

| | | |
|---|---|---|
| EP | 1 098 239 | 5/2001 |
| WO | WO 2008/073883 | 6/2008 |

OTHER PUBLICATIONS

UK Search Report dated Feb. 12, 2009 for GB 0818764.3.

* cited by examiner

*Primary Examiner*—Albert W Paladini
(74) *Attorney, Agent, or Firm*—NIxon & Vanderhye P.C.

(57) ABSTRACT

An integrated circuit is provided with a power domain which can be selectively powered-up or powered-down. An output circuitry serving to buffer a signal generated by the core circuitry within such a power domain has its own output power supply voltage. An adaptive voltage sensing circuit senses when the core power supply voltage to the core circuitry falls below a threshold level and generates a voltage-low signal. If output signal retention has been preselected to be active for the output signal concerned, then the output circuitry responds to the voltage-low signal by maintaining the output signal state (output signal driven low, output signal driven high or output signal in a high impedance drive state). The retention mode is preselected by a pulse with its value stored within a mode latch indicating whether or not retention is required. Thus, when the adapted voltage sensing circuitry itself senses the voltage level for the core circuitry falling below the threshold, it activates the retention operation.

25 Claims, 6 Drawing Sheets

MAINTAINING OUTPUT I/O SIGNALS WITHIN AN INTEGRATED CIRCUIT WITH MULTIPLE POWER DOMAINS

TECNICAL FIELD

The technical field relates to the field of integrated circuits, and more particularly, to the field of maintaining output signals within an integrated circuit where portions of that circuit are powered up and powered down as part of, for example, power saving techniques.

BACKGROUND

It is known to provide integrated circuits with multiple power domains. These power domains allow portions of the integrated circuit to be powered down (have their supply voltage removed) when they are not needed and so save energy. When this occurs, it is important that output signals being generated by a power domain which is being powered down and which are needed by another portion of the integrated circuit, or some other circuit operating in conjunction with the integrated circuit, should continue to be maintained in their original state. For example, between two power domains within an integrated circuit, one power domain may pass a particular bit value to another power domain(s) with that bit value being used to control processing in the other power domain. If the other power domain(s) can to continue processing, then this control signal should be maintained even though the first power domain is powered down.

One way of achieving the maintaining of output signals from the circuitry within a power domain (e.g. an area of core circuitry) which is being powered down is to surround that power domain with a wrapper of latch cells. Prior to the power domain being powered down, the output signals the circuitry within the power domain is generating can be transferred into the latch cells and then those latch cells can have power maintained to them during the power-down of the power domain which they surround. While such a technique does work, it suffers from the disadvantage that the action of the latch cells must be commanded and coordinated from a central controller. As an example, in the cycle prior to power-down of the domain, the latches must be supplied with an appropriate control and clock signal to move the output values into the latches. This adds complexity to the integrated circuit and its control during operation.

SUMMARY

Viewed from one aspect the technology described in this application provides an integrated circuit comprising:

core circuitry powered by core power supply circuitry at a core power supply voltage, said core circuitry having a core output;

output circuitry powered by output power supply circuitry, said output power supply circuitry being controlled separately from said core power supply circuitry, and coupled to said core circuitry to receive a core signal from said core output, said output circuitry being at least partially dependent upon said core signal to generate an output signal having one of a plurality of different output states;

voltage sensing circuitry coupled to said core power supply circuitry and responsive to sensing of said core power supply voltage falling below a threshold level to assert a voltage-low signal;

a mode signal store responsive to a retention preselecting signal to store a mode signal indicative of whether or not signal retention is preselected; wherein said output circuitry is responsive to asserting of said voltage-low signal when said mode signal indicates retention is preselected to maintain a current output state of said output signal independently of said core signal.

The present technique provides a mechanism whereby the output circuitry acting in cooperation with the voltage sensing circuitry and a mode signal store may be made responsible for controlling its own operation to maintain an output signal value when the core circuitry it is at the boundary of is powered down. The requirement to maintain the output signal is preselected (e.g. set up in advance) and indicated by a mode signal stored within a mode signal store. It will typically be known at design time which output signals need to be maintained through power-down and so there is no need to wait until the cycle prior to a power-down occurring in order to indicate that such signal maintaining operation should be performed. With the request for retention of the output signal preselected and stored in this way, the voltage sensing circuitry can itself monitor the supply voltage to the core circuitry which is subject to power-down and sense when this falls below a threshold value. When the core power supply passed by voltage falls below this threshold value and the mode signal indicates that the output signal state is to be maintained, then the output circuitry can switch to operating so as to maintain its output state independently of the signal being supplied to it by the core circuitry which has, or is having, its core power supply voltage removed. Enabling the maintaining of the output signal state to become self-maintaining this way advantageously reduces the control overhead associated with power domain power-down and power-up.

It will be appreciated that the output state being maintained for a given output signal could vary and could be any of a state driven to a high voltage level, a state driven to a low voltage level and an undriven high impedance state. The desired result is that the effect of the output signal prior to power-down should be maintained after power-down of the core circuitry and accordingly, for example, if the output signal was having no effect due to being undriven and being in a high impedance state, then this should be maintained through the power-down.

The voltage sensing circuitry could be arranged to operate with a substantially fixed output power supply voltage relative to which the core power supply voltage can be maintained in order to establish whether or not the core power supply voltage has fallen below the threshold value. However, the design reusability of the mechanism is enhanced when the voltage sensing circuit is adapted to different output power supply voltages within an operational range so as to maintain the threshold level of the core power supply voltage substantially constant. The additional overhead of making the voltage sensing circuitry adaptive in this way is more than compensated for by the improved design reuse capability. Furthermore, the voltage sensing circuitry can be shared between many or all of the output signals associated with an area of core circuitry being powered down and accordingly the overhead of the voltage sensing circuitry is heavily amortized.

If the mode signal does not indicate that retention is preselected and the voltage-low signal is asserted, then the output circuitry may respond by generating an output signal having an undriven high impedance state. This behavior is "safe" in that it reduces the likelihood of the output signal having an undesired effect upon other circuitry as a consequence of the power-down of the core circuitry responsible for controlling the level of that output signal.

It will be appreciated that total power-down of the integrated circuit will sometimes occur and in these circumstances the output power supply voltage will also be powered down. When the output power supply voltage is restored, embodiments of the invention may use request reset circuitry to reset the mode signal store to a state indicating that retention is not preselected. This allows a more reliable power-up of the integrated circuit as a whole since it reduces the likelihood of the output circuitry seeking to erroneously maintain an output signal state which was not in fact required.

The robustness of the control of the output circuitry during its action to maintain a current output state, or not during power-on of the integrated circuit as a whole, is improved when differential signalling is used as such differential signalling is less sensitive to the absolute values of the control signals.

Some embodiments can use the multiplexing circuitry to switch the voltage-low signal to generate either the retention active signal or the power-on control signal in dependence upon the mode signal.

As previously mentioned, the output circuitry could be disposed at a variety of different points within the integrated circuit. The output circuitry will typically be output signal buffer circuitry providing a buffering role. The buffering could be associated with an output signal being drive off-chip, or it may be buffering between power domains, possibly with voltage level shifting, being achieved either between power domains or in order to generate off-chip signals.

Viewed from another aspect the technology described in this application provides an integrated circuit comprising:

core circuit means powered by core power supply means at a core power supply voltage, said core circuit means having a core output;

output circuit means powered by output power supply means, said output power supply means being controlled separately from said core power supply means, and coupled to said core circuit means to receive a core signal from said core output, said output circuit means being at least partially dependent upon said core signal to generate an output signal having one of a plurality of different output states;

voltage sensing means coupled to said core power supply means for sensing said core power supply voltage and for asserting a voltage-low signal in responsive to sensing of said core power supply voltage falling below a threshold level;

a mode signal store means responsive to a retention preselecting signal for storing a mode signal indicative of whether or not signal retention is preselected; wherein said output circuit means is responsive to asserting of said voltage-low signal when said mode signal indicates retention is preselected to maintain a current output state of said output signal independently of said core signal.

Viewed from a further aspect the technology described in this application provides a method of operating an integrated circuit, said method comprising the steps of:

powering core circuitry at a core power supply voltage using core power supply circuitry, said core circuitry having a core output;

powering output circuitry using output power supply circuitry, said output power supply circuitry being controlled separately from said core power supply circuitry;

receiving with said output circuitry a core signal from said core output;

in at least partial dependence upon said core signal, generating with said output circuitry an output signal having one of a plurality of different output states;

sensing said core power supply voltage with sensing circuitry coupled to said core power supply circuitry;

asserting a voltage-low signal voltage in response to sensing of said core power supply voltage falling below a threshold level;

in response to a retention preselecting signal, storing in a mode signal store a mode signal indicative of whether or not signal retention is preselected; and in response to asserting of said voltage-low signal when said mode signal indicates retention is preselected, maintaining a current output state of said output signal independently of said core signal.

The above, and other objects, features and advantages of this technology will be apparent from the following detailed description of illustrative embodiments which is to be read in connection with the accompanying drawings.

DESCRIPTION

Figure 1:
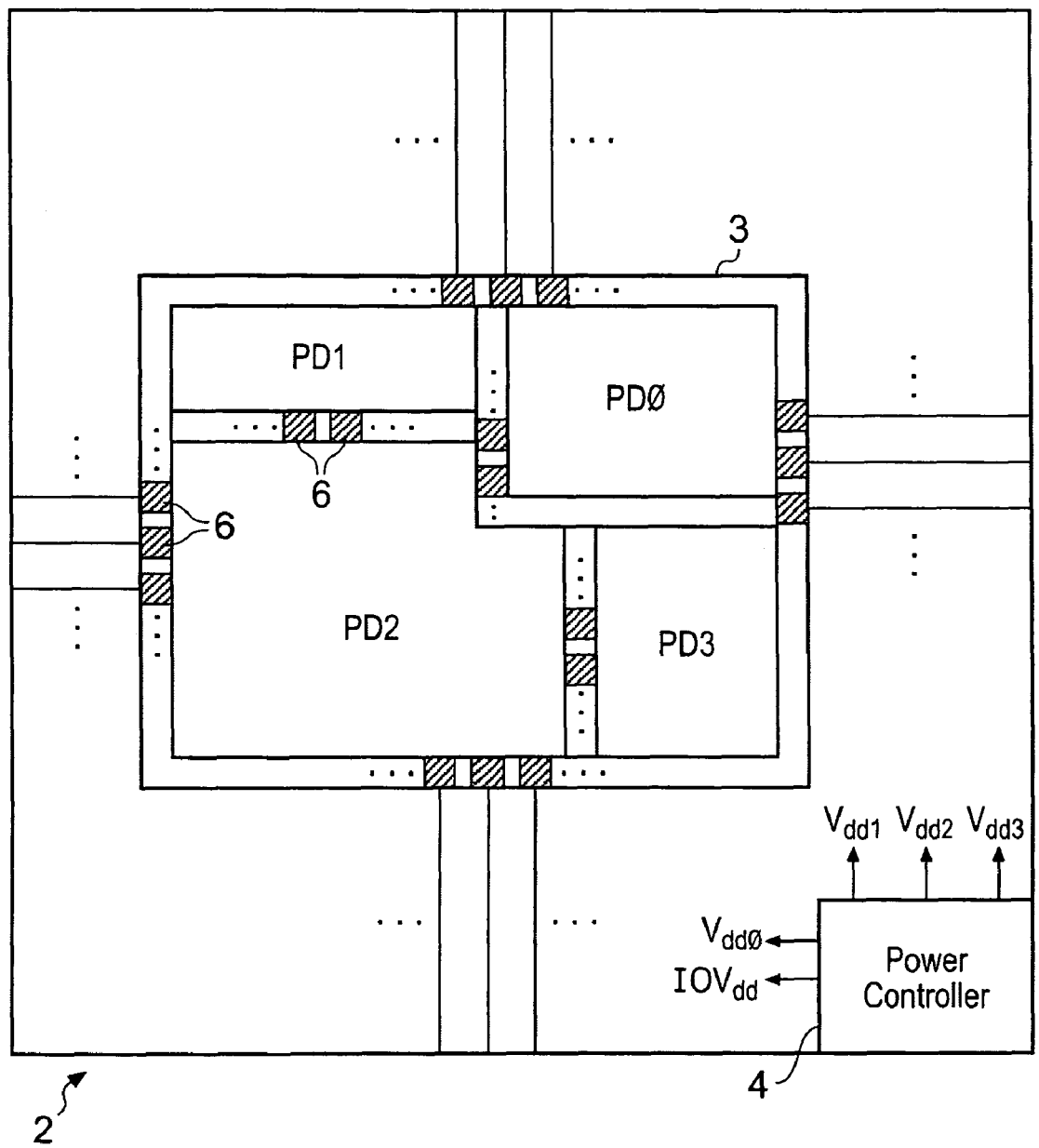
FIG. 1 schematically illustrates an integrated circuit having multiple power domains.

FIG. 1 schematically illustrates an integrated circuit 2 incorporating multiple power domains PD0, PD1, PD2 and PD3 within a chip boundary 3. A power controller 4 operates to generate independent domain power supply voltages $V_{dd0}$, $V_{dd1}$, $V_{dd2}$ and $V_{dd3}$, which are used to power the respective power domains PD0, PD1, PD2 and PD3. As is known in such multiple power domain circuitry, the power domains may be independently powered up or powered down as required.

Also illustrated in FIG. 1 are input/output buffer cells 6 which are provided both between power domains and between a power domain and the outside of the integrated circuit 2. These input/output buffer cells 6 provide level shifting capabilities in order to deal with different power supply operating voltages on either side and are used in accordance with the present techniques to selectively maintain output signal state when this maintaining (retaining) function is preselected. The output buffer cells are provided with their own output circuit power supply voltage $IOV_{dd}$ generated by the power controller 4 and this is maintained independently of the power-on or power-off status of the power supply voltages to the separate power domains PD0, PD1, PD2 and PD3.

Figure 2:
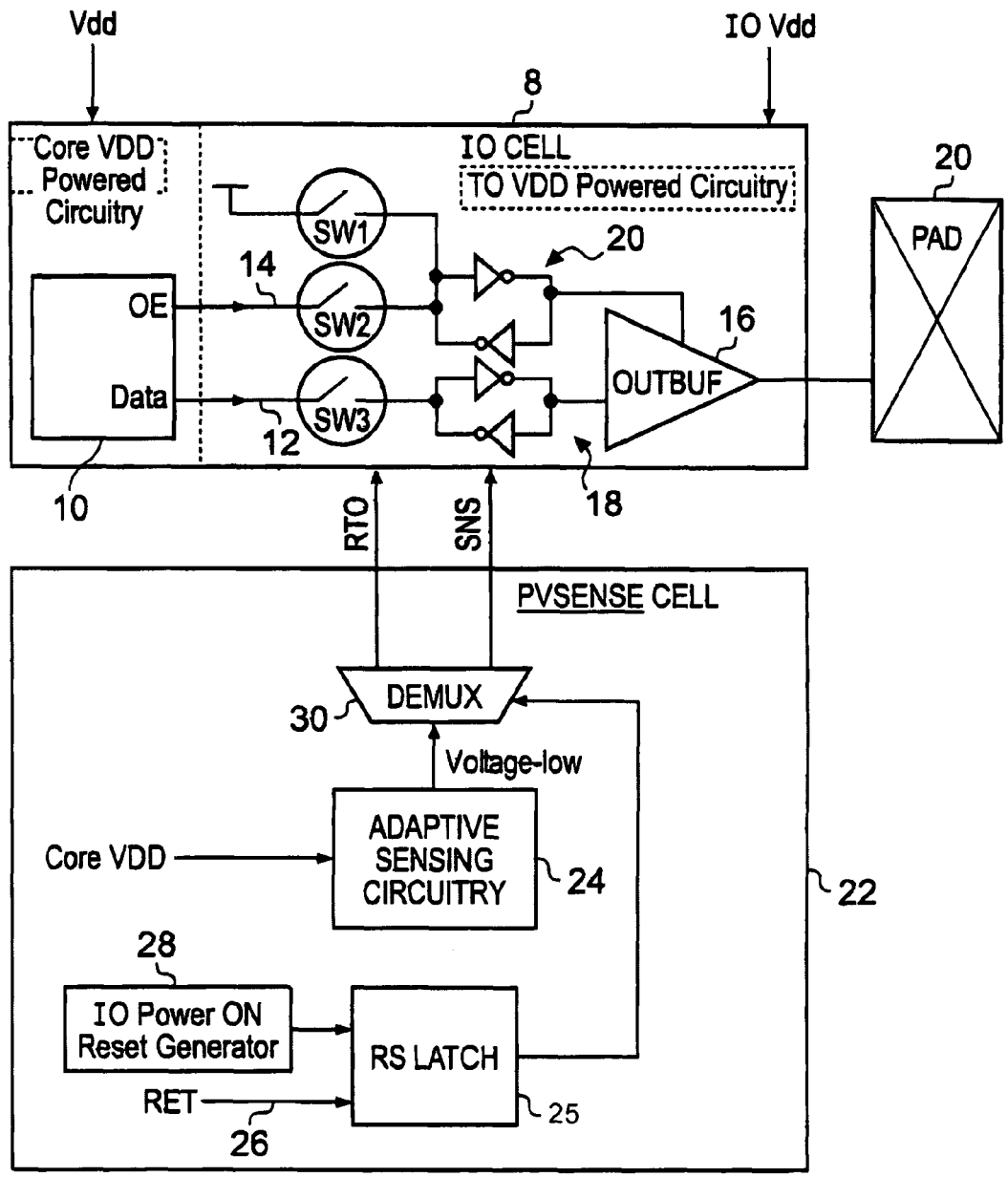
FIG. 2 schematically illustrates an output buffer cell through which a core signal being generated by core circuitry which is subject to power-down is passed.

FIG. 2 schematically illustrates output circuitry 8 coupled to core circuitry 10. A core signal 12 is generated by the core circuitry 10 and passed to the output circuitry 8. If an output enable signal 14 generated by the core circuitry 10 indicates that the core signal is valid and should be driven out, then an output buffer 16 within the output circuitry 8 is controlled so as to be switched on and drive the core signal out to, for example, a pad 20 in the form of an output signal. It will be appreciated that as well as changing the impedance of this output signal, the output buffer 16 could also change the voltage, such as part of a level shifting function. The output circuitry 8 is provided with its own output power supply voltage $IOV_{dd}$. Latch circuits 18, 20 respectively latch the core signal 12 and the signal which enables or disables the output buffer 16. This permits the signals to be maintained when the core power supply voltage $V_{dd}$ is removed should state maintaining operation be preselected.

Also illustrated in FIG. 2 is a block of control circuitry 22. This control circuitry 22 can be shared between many output cells 8 and accordingly the overhead associated with the provision of this control circuitry 22 is heavily amortized. Within the control circuitry 22 there is provided adaptive sensing circuitry 24 which is responsive to the core power supply voltage $V_{dd}$ to generate a voltage-low signal if the core power supply voltage $V_{dd}$ falls below a threshold value. A mode latch 25 serves to store a mode signal indicating whether retention is preselected. The mode latch 25 is set by a retention preselecting signal 26. A reset signal generator 28 serves to generate a reset signal for resetting the mode latch 25 when the output power supply voltage $IOV_{dd}$ powers on. The mode signal within the mode latch 25 is supplied to a demultiplexer 30 which serves to switch the voltage-low signal generated by the adaptive sensing circuitry 24 to provide either a retention active signal RTO or a power-on control signal SNS. The retention active signal RTO and the power-on control signal SNS both use differential signaling.

It will be appreciated that FIG. 2 illustrates the circuitry for performing the present techniques at an architectural level and that many different detailed implementations of the circuits for achieving the present technique may be provided. These different alternative detailed implementations are encompassed within the present technique.

Figure 3:
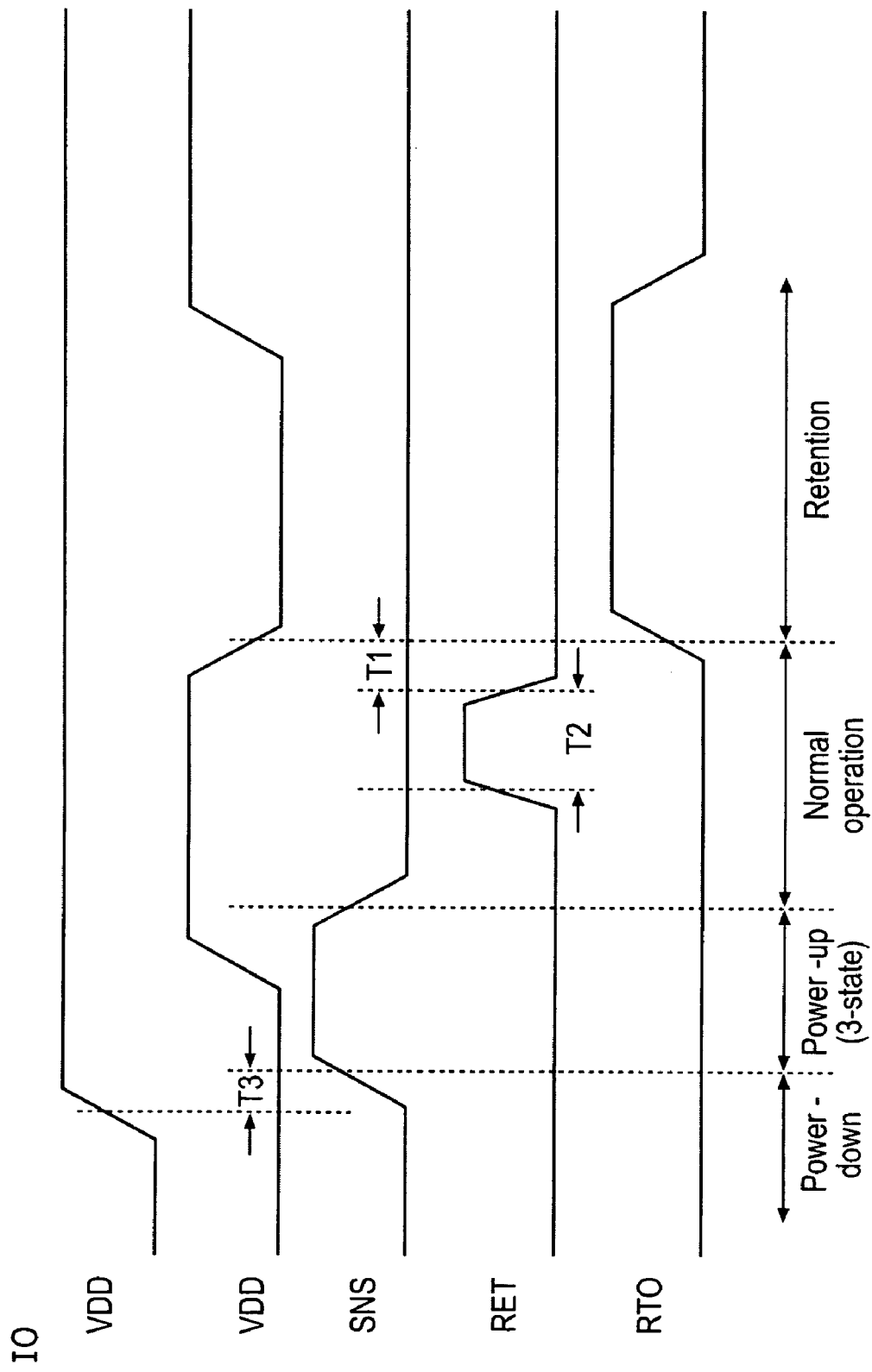
FIG. 3 is a signal timing diagram illustrating control signals used to control circuitry of FIG. 2.

FIG. 3 is a control signal timing diagram illustrating the behavior of various control signals within FIG. 2. At the start of the operation illustrated in FIG. 3, the integrated circuit 2 as a whole is powered down. The first action is the powering up of the output power supply voltage $IOV_{dd}$. This power-up of the output power supply voltage is controlled by the power controller 4. The reset signal generator 28 generates a reset signal when this power-up is detected and this resets the mode latch 25. As the core power supply voltage $V_{dd}$ is not yet powered up, the adaptive sensing circuitry 24 will generate a voltage-low signal indicating that the core power supply voltage $V_{dd}$ is below the threshold level. The demultiplexer 30 will switch this voltage-low signal under control of the mode signal which has been reset within the mode latch 25 so as to form a power-on control signal SNS. The power-on control signal SNS acts to close the switch SW1 within the output circuitry 18 so as to disable the output buffer 16 and force the output signal into a high impedance undriven state during the power-on operation. The output signal is thus tri-stated.

As time progresses, the power supply voltage $V_{dd}$ becomes powered up and accordingly rises above the threshold level such that the adaptive sensing circuitry 24 no longer produces voltage-low signal and accordingly the power-on control signal SNS will be deasserted. Normal operation of the output circuitry 8 then commences with the core signal 12 being generated by the core circuitry 10 and the output buffer 16 being enabled and disabled by an output enable signal 14 generated by the core circuitry 10.

If the nature of the core signal 12 and the output signal to be generated by the output buffer 16 so dictates, then retention of the output state of the output signal may be preselected by use of a retention preselecting signal RET so as to be performed on power-down of the core power supply voltage. This retention preselecting signal RET can be generated by a centralized controller. Alternatively, it can be generated by a local circuit designed to fire a few cycles after the core power supply voltage has been powered on. It will generally be known at design time whether or not output state maintenance is desired for a given output signal. If output signal maintenance is never required for a given output signal, then the retention preselecting signal RET may be tied low. The retention preselecting signal RET is latched within the mode latch 25.

When normal operation comes to an end and the core power supply voltage is to be powered off (such as for power saving reasons), then the adaptive sensing circuitry 24 will locally sense the core power supply voltage falling below the threshold level and assert the voltage-low signal. As the mode signal within the mode latch 25 is now set, the demultiplexer 30 will route the voltage-low signal for use as a retention active signal RTO which is passed to the output circuitry 8. This retention active signal can again use differential signalling to improve its robustness compared to a signal requiring an absolute level. Such robustness is significant during power-up and power-down operations as absolute signal voltage levels can be uncertain in such circumstances. The retention active signal RTO serves to open all three switches SW1, SW2 and SW3 illustrated within the output circuitry 8 such that the latches 18 and 20 serve to maintain the last value of the core signal 12 input to the output buffer 16 together with the current state of the output enable signal 14. Thus, the output buffer 16 will maintain one of three states, namely driving the output signal to a low voltage, driving the output signal to a high voltage or a high impedance state in which the output signal is undriven.

In summary the retention active signal RTO and the power-on control signal SNS generated by the control circuit 22 control the switches S1, S2 and S3 within the output circuitry 8. During power-up of the integrated circuit 2, the SNS signal is high and the RTO signal is low, switch SW2 is open and switch SW1 is closed so that the output buffer 16 is tri-stated. During normal operation both SNS and RTO are low, switch SW1 is open and switches SW2 and SW3 are closed. During retention operation all three switches SW1, SW2 and SW3 are open.

The retention preselecting signal RTE need only be pulsed once to set the mode latch 25. Once the mode signal is set within the mode latch 24, then the adaptive sensing circuitry 24 and the circuitry within the output circuitry 8 will together serve to maintain the state of the output signal if the core power supply voltage $V_{dd}$ is powered down.

Figure 4:
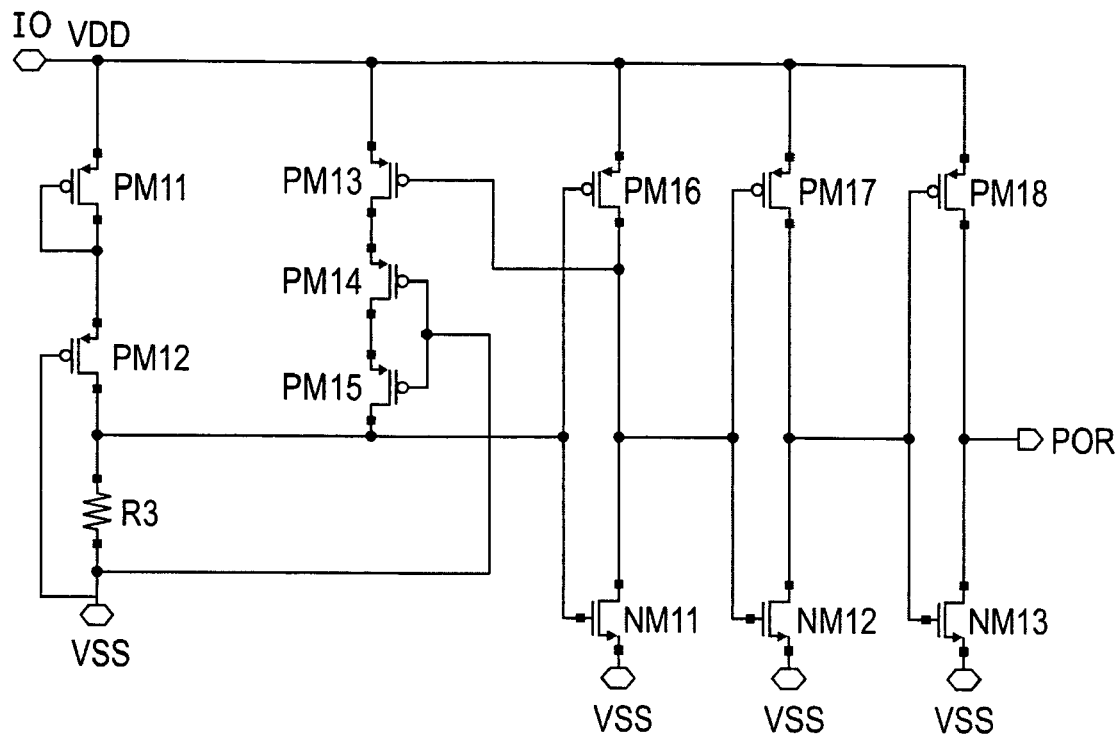
FIG. 4 is a transistor level diagram of a reset signal generator.
Figure 5:
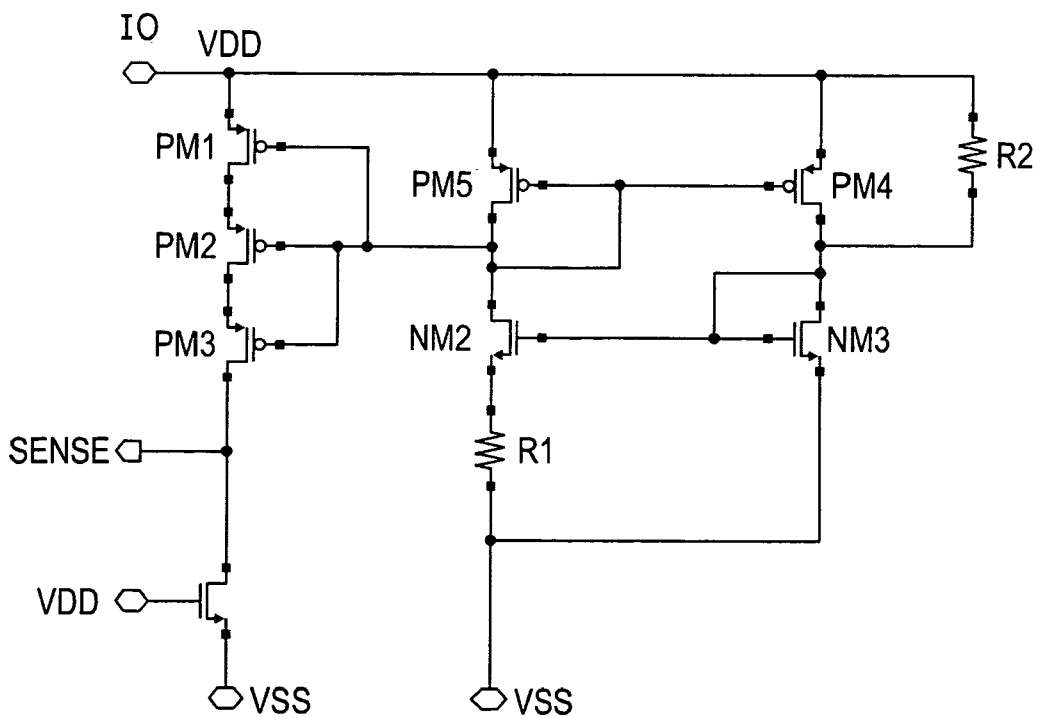
FIG. 5 is a transistor level diagram of adaptive voltage sensing circuitry.
Figure 6:
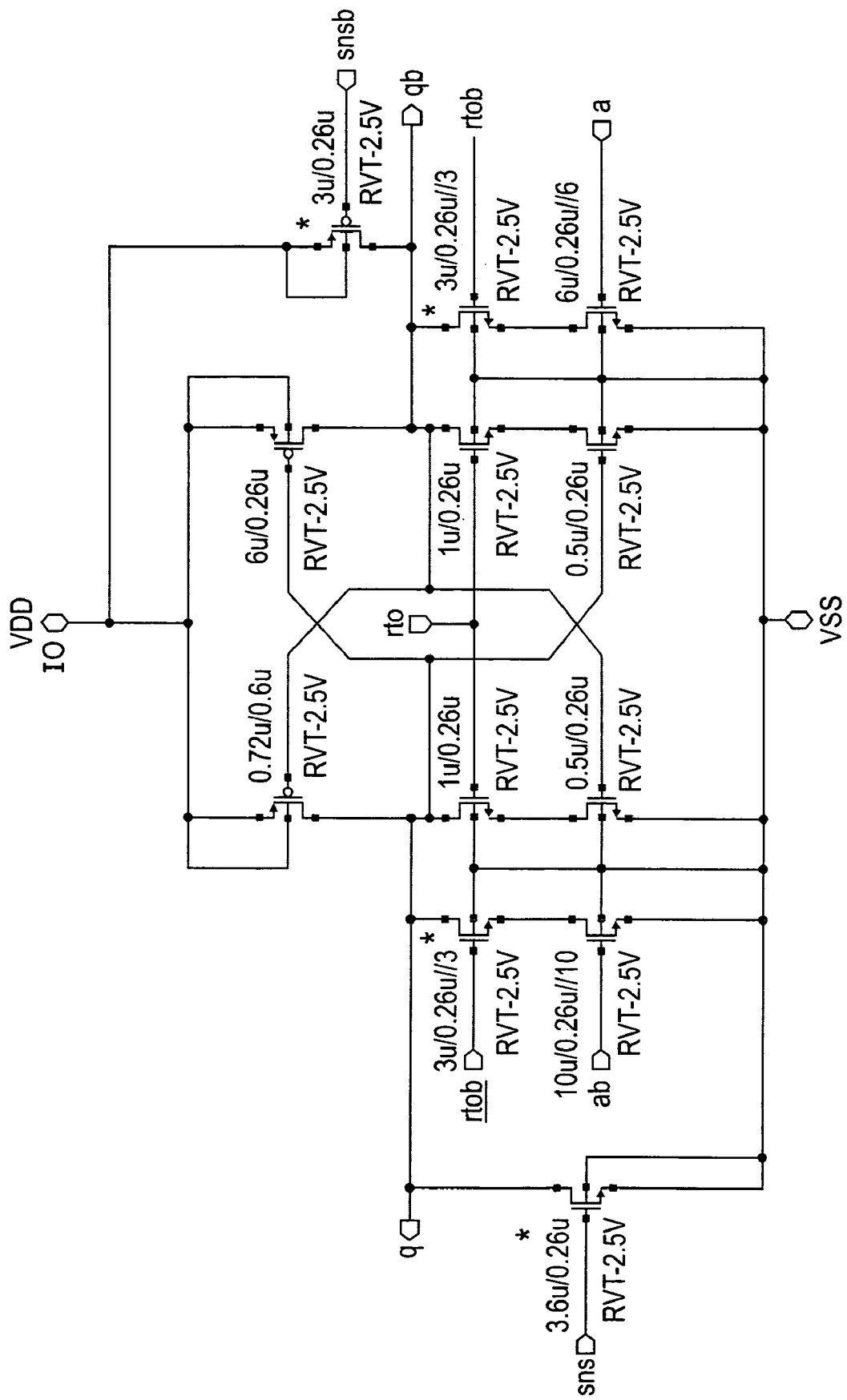
FIG. 6 is a transistor level diagram of an output signal buffer cell providing level shifting and output state maintaining functions.

FIGS. 4, 5 and 6 give example transistor level circuits which may be used to implement the architecture of FIG. 2. FIG. 4 shows an example of the reset signal generating circuitry 28. This reset signal generating circuitry 28 generates a reset signal for the mode latch in response to power-up of the output power supply voltage $IOV_{dd}$. Gates PM11 and PM12 together with resistor R3 form a voltage divider that senses the output power supply voltage $IOV_{dd}$ voltage level. The gates PM16 and NM11 digitize this voltage to a logic level. Gates PM17, NM12, PM18 and NM13 provide additional wave shaping. Gates PM13, PM14 and PM15 provide a feedback path to reduce the static leakage current within the reset signal generating circuitry 28.

FIG. 5 illustrates an example transistor level impelementation of the adaptive voltage sensing circuitry 24. Gates PM5, PM4, NM2 and NM3 together with resistance R1 form a self-biased active load. This provides a trans-conductance which is substantially insensitive to the level of the output power supply voltage $IOV_{dd}$. The action of this self-biased active load serves to adjust the voltage at the gate inputs of the gates PM1, PM2 and PM3, which act as a load for the sensing gate NM1. The SENSE signal illustrated in FIG. 5 is the voltage-low signal indicative of whether or not the core power supply voltage $V_{dd}$ is above or below a threshold level. The threshold level is maintained substantially constant with variation in the output power supply voltage. A resistor R2 is a high value resistor serving to provide a weak start-up current for the self-biased load.

FIG. 6 illustrates a transistor level implementation of the output circuitry 8. The output circuitry 8 in this example serves as a level-shifter, as a buffer and to provide the output state maintaining functions previously described. The additional functions of providing maintenance of the output state are achieved by the addition of the four gates marked with an "*" in FIG. 6. It will be seen that differential signalling is used for the power-on control signal SNS and the retention active signal RTO which is applied at multiple points about the substantially symmetric circuit. The output enable signal q and the core signal a are similarly provided in the form of differential signals.

Figure 7:
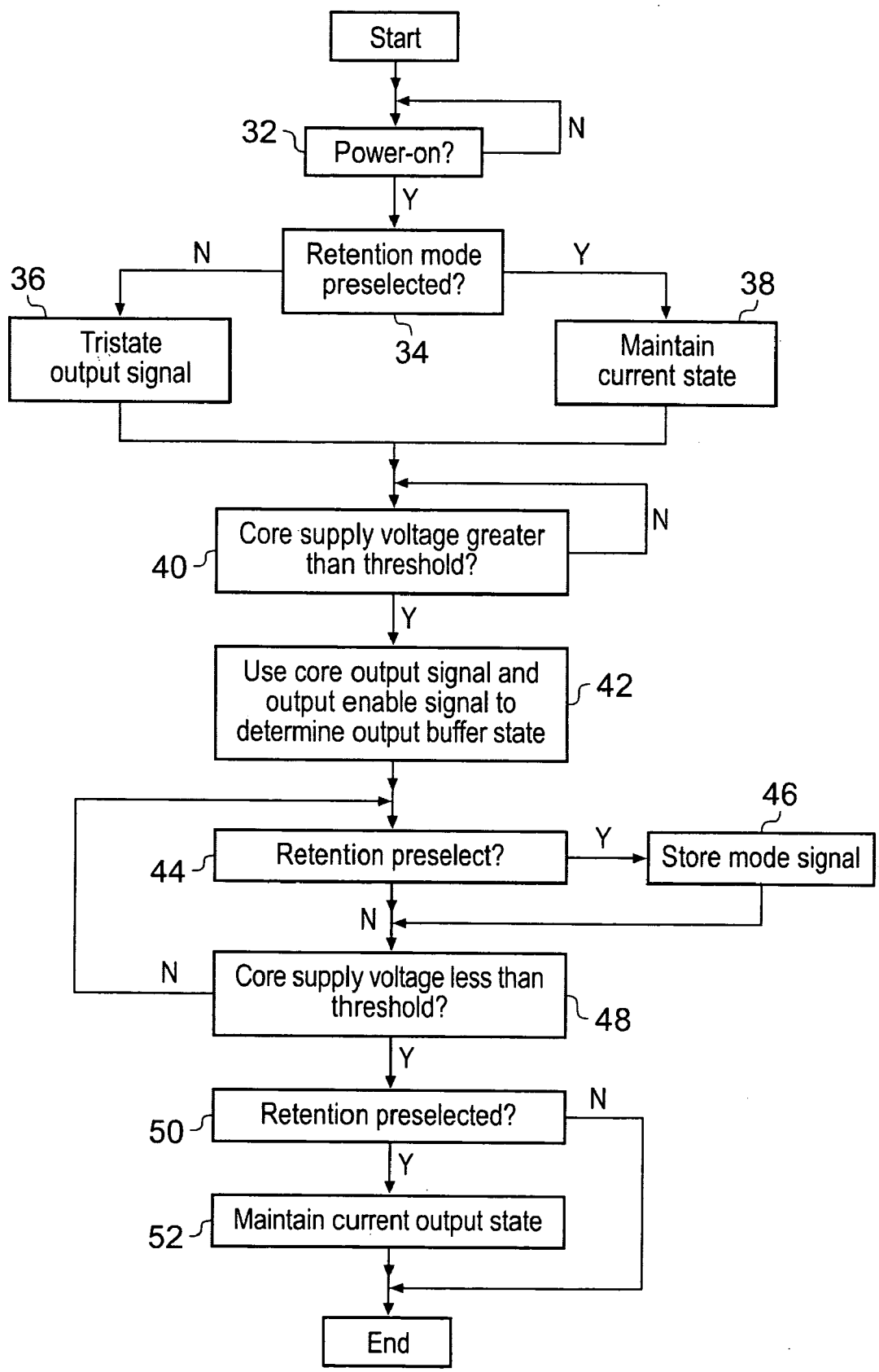
FIG. 7 is a flow diagram schematically illustrating an example of the operation of the present techniques.

FIG. 7 is a flow diagram schematically illustrating the operation of the present techniques in one example embodiment. At step 32 the process waits for power-on of the core power supply voltage to be detected by the adaptive sensing circuitry 24. When such power-on is detected, then step 34 determines whether the retention mode is preselected, as indicated by the mode signal within the mode latch 25. If the retention mode is preselected, then step 38 maintains the current output state of the output signal generated by the output buffer 16 during the power-on. If the retention mode is not preselected, then step 36 serves to tri-state the output signal (place it into a high impedance state in which it is undriven). At step 40 the process waits for the core power supply voltage to become greater than the threshold level. When this is achieved, processing proceeds to step 42 in which normal operation is enabled with the core output signal and the core output enable signal being used to control the output buffer 16 so as to determine the output buffer state (output driven low, output driven high or output undriven). At step 44 the process determines whether a retention preselecting signal RTE is generated. If such a signal is generated, then a mode signal is stored within the mode latch 25 by step 46. Step 48 determines whether or not the core power supply voltage has fallen below the threshold level. If the core power supply voltage has not fallen below the threshold level, then normal operation is proceeding and processing is returned to step 44 where the process continues to watch for setting of the retention preselecting operation. When the determination at step 48 is that the core power supply voltage has fallen to less than the threshold level, then processing proceeds to step 50 at which a determination is made as to whether or not retention operation has been preselected by the setting of the mode signal within the mode latch 24. If retention operation has been preselected, then step 52 serves to control the output circuitry 8 so as to maintain the current output signal state as previously described. If retention has not been preselected, then step 52 is bypassed.

It will be appreciated that the flow diagram of FIG. 7 illustrates the processes being performed in a sequential manner. As these processes can be performed by hardware circuit elements, it will be understood by those in this technical field that many of these processes will take place in parallel, or with a different relative order. The flow diagram is one representation of one possible overall control scheme.

Although illustrative example embodiments have been described in detail herein with reference to the accompanying drawings, it is to be understood that the technology described in this application is not limited to those embodiments, and that various changes and modifications can be effected therein by one skilled in the art without departing from the scope and spirit of the invention as defined by the appended claims.

We claim:

1. An integrated circuit comprising:
   core circuitry powered by core power supply circuitry at a core power supply voltage, said core circuitry having a core output;
   output circuitry powered by output power supply circuitry, said output power supply circuitry being controlled separately from said core power supply circuitry, and coupled to said core circuitry to receive a core signal from said core output, said output circuitry being at least partially dependent upon said core signal to generate an output signal having one of a plurality of different output states;
   voltage sensing circuitry coupled to said core power supply circuitry and responsive to sensing of said core power supply voltage falling below a threshold level to assert a voltage-low signal;
   a mode signal store configured to receive a retention preselecting signal, said mode signal store being responsive to said retention preselecting signal to store a mode signal indicative of whether or not said retention preselecting signal indicates that signal retention is preselected; wherein
   said output circuitry, said voltage sensing circuitry, and mode signal store are configured such that said output circuitry is responsive to asserting of said voltage-low signal when said mode signal indicates retention is preselected to maintain a current output state of said output signal independently of said core signal.

2. An integrated circuit as claimed in claim 1, wherein said plurality of different output states comprise:
   a state driven to a high voltage level;
   a state driven to a low voltage level; and
   an undriven high impedance state.

3. An integrated circuit as claimed in claim 1, wherein said output power supply circuitry powers said output circuitry at an output power supply voltage and said voltage sensing circuitry is adaptive to different output power supply voltages within an operational range to maintain said threshold level of said core power supply voltage substantially constant.

4. An integrated circuit as claimed in claim 1, wherein said output circuitry is responsive to asserting of said voltage-low signal when said mode signal does not indicate retention is preselected to generate an output signal having an undriven high impedance state.

5. An integrated circuit as claimed in claim 1, comprising request reset circuitry responsive to power-up of said output circuitry by said output power supply circuitry to reset said mode signal store to a state indicating retention is not preselected.

6. An integrated circuit as claimed in claim 1, wherein said output circuitry is controlled to maintain said current output state by a retention active signal being a differential signal.

7. An integrated circuit as claimed in claim 4, wherein said output circuitry is controlled to generate said output signal having said undriven high impedance state by a power-on control signal being a differential signal.

8. An integrated circuit as claimed in claim 6, wherein
   said output circuitry is controlled to generate said output signal having said undriven high impedance state by a power-on control signal being a differential signal; and comprising demultiplexing circuitry switched in dependence upon said mode signal to use said voltage-low signal to generate one of said retention active signal and said power-on control signal.

9. An integrated circuit as claimed in claim 1, wherein said output circuitry is output signal buffer circuitry.

10. An integrated circuit as claimed in claim 1, comprising power supply control circuitry coupled to said core power supply circuitry and operable so as to enable and disable said core power supply circuitry while said output power supply circuitry remains enabled.

11. An integrated circuit as claimed in claim 10, wherein combined operation of said voltage sensing circuitry, said mode signal store and said output circuitry independently maintain said current output state as said core power supply circuitry is disabled.

12. An integrated circuit as claimed in claim 1, comprising a plurality of power domains containing core circuitry and each having separately controllable power supply circuitry.

13. An integrated circuit comprising:
core circuit means powered by core power supply means at a core power supply voltage, said core circuit means having a core output;
output circuit means powered by output power supply means, said output power supply means being controlled separately from said core power supply means, and coupled to said core circuit means to receive a core signal from said core output, said output circuit means being at least partially dependent upon said core signal to generate an output signal having one of a plurality of different output states;
voltage sensing means coupled to said core power supply means for sensing said core power supply voltage and for asserting a voltage-low signal in responsive to sensing of said core power supply voltage falling below a threshold level;
a mode signal store means for receiving a retention preselecting signal and for storing a mode signal indicative of whether or not said retention preselecting signal indicates that signal retention is preselected; wherein
said output circuit means, said voltage sensing means, and said mode signal store means are configured such that said output circuit means is responsive to asserting of said voltage-low signal when said mode signal indicates retention is preselected to maintain a current output state of said output signal independently of said core signal.

14. A method of operating an integrated circuit, said method comprising the steps of:
powering core circuitry at a core power supply voltage using core power supply circuitry, said core circuitry having a core output;
powering output circuitry using output power supply circuitry, said output power supply circuitry being controlled separately from said core power supply circuitry;
receiving with said output circuitry a core signal from said core output;
in at least partial dependence upon said core signal, generating with said output circuitry an output signal having one of a plurality of different output states;
sensing said core power supply voltage with sensing circuitry coupled to said core power supply circuitry;
asserting a voltage-low signal voltage in response to sensing of said core power supply voltage falling below a threshold level;
in response to a retention preselecting signal, storing in a mode signal store a mode signal indicative of whether or not said retention preselecting signal indicates that signal retention is preselected; and
in response to asserting of said voltage-low signal when said mode signal indicates retention is preselected, maintaining a current output state of said output signal independently of said core signal.

15. A method as claimed in claim 14, wherein said plurality of different output states comprise:
a state driven to a high voltage level;
a state driven to a low voltage level; and
an undriven high impedance state.

16. A method as claimed in claim 14, wherein said output power supply circuitry powers said output circuitry at an output power supply voltage and said voltage sensing circuitry adapts to different output power supply voltages within an operational range to maintain said threshold level of said core power supply voltage substantially constant.

17. A method as claimed in claim 14, wherein in response to asserting of said voltage-low signal when said mode signal does not indicate retention is preselected, generating an output signal having an undriven high impedance state.

18. A method as claimed in claim 14, comprising in response to power-up of said output circuitry by said output power supply circuitry, resetting said mode signal store to a state indicating retention is not preselected.

19. A method as claimed in claim 14, comprising controlling said output circuitry to maintain said current output state using a retention active signal being a differential signal.

20. A method as claimed in claim 17, wherein controlling said output circuitry to generate said output signal having said undriven high impedance state using a power-on control signal being a differential signal.

21. A method as claimed in claim 19, comprising
controlling said output circuitry to generate said output signal having said undriven high impedance state using a power-on control signal being a differential signal; and
in dependence upon said mode signal, switching said voltage-low signal with demultiplexer circuitry to generate one of said retention active signal and said power-on control signal.

22. A method as claimed in claim 14, wherein said output circuitry is output signal buffer circuitry.

23. A method as claimed in claim 14, comprising enabling and disabling said core power supply circuitry while said output power supply circuitry remains enabled.

24. A method as claimed in claim 23, wherein combined operation of said voltage sensing circuitry, said mode signal store and said output circuitry independently maintain said current output state as said core power supply circuitry is disabled.

25. A method as claimed in claim 14, comprising separately controlling power supplies of a plurality of power domains containing core circuitry.

* * * * *